United States Patent [19]

Frutschi et al.

[11] 3,951,737

[45] Apr. 20, 1976

[54] POWER GENERATING PLANT WITH A GAS-COOLED NUCLEAR REACTOR WITH CLOSED GAS CIRCULATION

[75] Inventors: Hans Frutschi, Riniken near Brugg; Gerassimos Sarlos, Brugg-Laufohr; Jean-Francois Dupont, Klingnau; Dieter Haschke, Wittnau, all of Switzerland

[73] Assignee: Gesellschaft zur Förderung der Forschung an der Eidgenössischen Technischen Hochschule, Zurich, Switzerland

[22] Filed: Sept. 24, 1973

[21] Appl. No.: 400,421

[30] Foreign Application Priority Data

Mar. 26, 1973  Switzerland.................... 4314/73

[52] U.S. Cl................................ 176/60; 176/38; 176/40; 176/55
[51] Int. Cl.² ............... G21C 3/56; G21C 19/28
[58] Field of Search .......... 176/60, 65, 55, 58, 176/38, 40

[56] References Cited
UNITED STATES PATENTS

| | | |
|---|---|---|
| 3,377,800 | 4/1968 | Spillmann ...................... 176/60 X |
| 3,410,091 | 11/1968 | Frutschi .......................... 176/60 X |
| 3,748,228 | 7/1973 | Zimmermann ...................... 176/60 |
| 3,788,944 | 1/1974 | Stracke et al ...................... 176/60 |

Primary Examiner—Harvey E. Behrend
Assistant Examiner—Harold Tudor
Attorney, Agent, or Firm—Werner W. Kleeman

[57] ABSTRACT

A power generating plant equipped with gas-cooled nuclear reactor with closed gas circulation system leading through at least one compressor, the reactor, through a first and a second gas turbine and back to the compressor. One of the gas turbines is in driving connection with the compressor and the other of the gas turbines is in driving connection with an electric generator for the delivery of electrical energy. There is also provided a recuperative heat exchanger, the primary path of which is located between the outlet of the second gas turbine and the inlet of the compressor. The reactor is arranged in the gas circulation system between the two gas turbines and the secondary path of the recuperative heat exchanger is arranged directly between the outlet of the compressor and the inlet of the first gas turbine.

2 Claims, 2 Drawing Figures

POWER GENERATING PLANT WITH A GAS-COOLED NUCLEAR REACTOR WITH CLOSED GAS CIRCULATION

BACKGROUND OF THE INVENTION

The present invention relates to a new and improved construction of an energy generation installation, i.e. a power generating plant, of the type equipped with a gas-cooled nuclear reactor having a closed gas circulation system which extends through at least one compressor, the reactor, through a first and second gas turbine and back to the compressor, and wherein as concerns the gas turbines at least a respective one is in driving connection with the compressor and the other is in driving connection with an electric generator for the delivery of electrical energy, and there is further provided a recuperative heat exchanger having a primary path located between the outlet of the second gas turbine and the inlet of the compressor.

With prior art power generating plants of the above-mentioned type, the nuclear reactor is located in the gas-flow path between the compressor and the first gas turbine, and for improving the efficiency of the reactor the secondary path of the recuperative heat exchanger can be forwardly arranged for the purpose of pre-heating the gas.

The pressure conditions which exist in the gas circulation system of such plants can lead to considerable temporary pressure gradients during transient effects, and which particularly occur during regulating functions and during starting-up and shutting down of the plant. A particularly rapid drop in pressure occurs at the nuclear reactor during load decrease of the generator, that is to say, during sudden shutting-off of the electrical energy consumer. In order to be able to reduce to null the power delivered by the gas turbines rapidly enough, there must be opened a valve in a return flow path which is connected parallel to the compressor. As a result, the pressure conditions which prevail at the gas circulation system drop to the considerably lower no-load value. In the case of helium turbines which are employed for nuclear power plants, this entails a reduction in pressure at the turbine inlet and therefore in the reactor in the order of magnitude of 10 bar within a fraction of a second. Such pressure gradients can lead to extensive damage to the internal insulation of the reactor as well as to the structure of the reactor core.

It is known to the art that for plants or installations of the previously mentioned type it is possible to suppress the reduction in pressure in the reactor as a result of a load decrease at the generator if for the drive of the compressor on the one hand and for the drive of the generator on the other hand there are employed two gas turbines with separate shafts. However, a precondition for this arrangement is the reliable functioning of the requisite automatic regulating elements. Yet, also with this construction of the power plant there can not be avoided an undesired rapid pressure reduction at the reactor during quick shutdown of the turbine or during bucket damage or other damage to the turbo-machines.

Gas-cooled fast breeder reactors possess a small thermal storage capability because they do not contain any neutron moderator. Furthermore, they operate with very high power density and owing to their hard neutron spectrum possess a very short longevity of the prompt neutrons. These properties require that during rapid shutoff of such reactor it is necessary to immediately considerably reduce the cooling gas stream, since otherwise by under cooling the reactor there can occur impermissibly great temperature gradients. A reduction of the cooling gas stream can be realized by reducing the rotational speed of the turbo assembly, which however will result in a rapid pressure reduction at the reactor. An even more pronounced pressure reduction has been obtained during attempts to reduce the coolant stream by reducing the total gas quantity in the circulation system. If a bypass conduit which is connected parallel to the nuclear reactor is opened, in order to reduce the flow of the coolant gas stream through the reactor, then such produces a reduction in the rotational speed of the turbo assembly and therefore also a drop in pressure in the reactor.

Large pressure fluctuations are not only undesired in gas-cooled fast breeder reactors owing to the already mentioned danger of damaging the insulation and the reactor core structure, but also because of their positive influence upon the reactivity of the nuclear reactor, that is to say, owing to the therewith attendant reduction in the action of the moderator, for the compensation of which there is necessary an immediate adjustment at the reactor regulation system. On the other hand, the Doppler effect of the reactor upon the absence of the pressure changes of the coolant gas in the reactor should contribute completely to increasing the reactor stability.

From what has been discussed above, it should be apparent that in energy generating plants equipped with a gas-cooled nuclear reactor with a closed gas circulation system, it is of decisive importance that the coolant gas pressure in the nuclear reactor remain as constant as possible when, at other locations of the gas circulation system, there occur pressure equalization effects as such is especially the case during sudden shutting-off of the electrical energy consumer from the generator or during disturbances at the turbo assembly.

SUMMARY OF THE INVENTION

Hence, it is a primary object of the present invention to provide an improved construction of energy generating installation or power generating plant of the previously mentioned type such that upon the occurrence of pressure equalization effects at the gas circulation system the gas pressure within the nuclear reactor remains extensively constant.

Now in order to implement this object, and others which will become more readily apparent as the description proceeds, the power generating plant of this development is manifested by the features that the reactor is arranged at the gas circulation system between the two gas turbines, and the secondary path of the recuperative heat exchanger is arranged directly between the outlet of the compressor and the inlet of the first gas turbine.

A particularly advantageous constructional embodiment of the energy generating plant can be designed such that the operating pressure of the gas at the outlet from the first gas turbine and therefore at the inlet to the nuclear reactor at least approximately corresponds to the equalization pressure of the gas circulation system in the hot operating rest state. Under the term equalization pressure there is to be understood that pressure to which the gas enclosed in the circulation system adjusts itself when the turbo-assembly suddenly comes to a standstill in a still operating warm condition.

When the installation possesses in conventional manner a low pressure compressor and a high pressure compressor with an intermediately arranged intermediate cooler, then according to a further advantageous constructional embodiment of the installation such can be designed in such a way that the operating pressure of the gas at the outlet of the low pressure compressor likewise at least approximately corresponds to the equalization pressure of the gas circulation system in the hot operating rest state.

The shafts of the two gas turbines, the generator and compressor or the two compressors respectively, can be directly coupled with one another.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
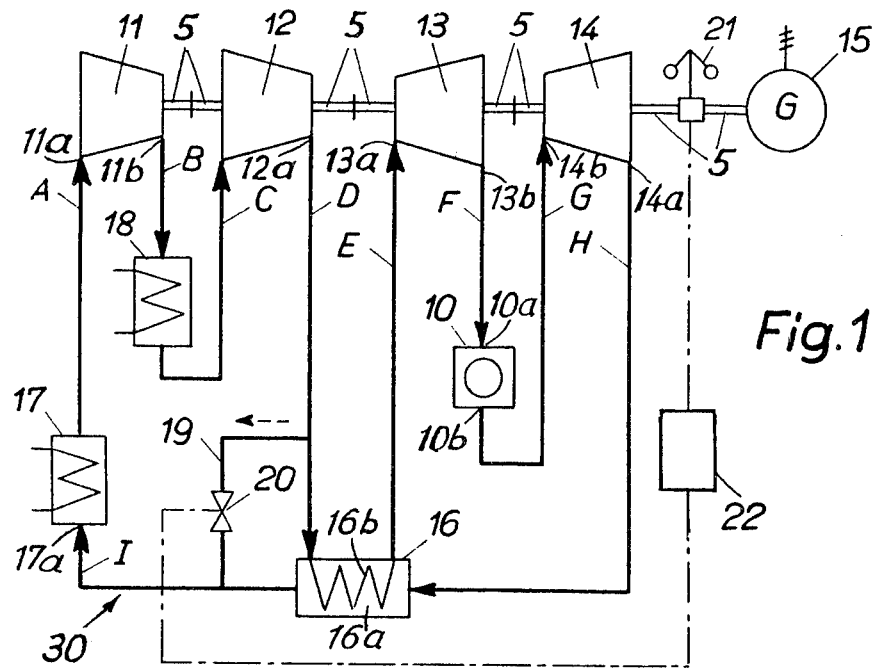
FIG. 1 schematically illustrates the gas circulation system of an energy generating installation or power generating plant incorporating a gas-cooled nuclear reactor and a gas turbine-compressor-generator assembly or group.

Describing now the drawing, the power generating plant depicted in FIG. 1 will be understood to comprise a gas-cooled nuclear reactor 10 serving as a source of thermal energy. The gas used for cooling the reactor 10, preferably helium, is conducted through a closed circulation system 30 and passes through a low pressure compressor 11, a high pressure compressor 12, a first gas turbine 13, and a second gas turbine 14. The shafts, generally indicated by reference character 5, of all of the aforementioned turbo-machines 11–14 are suitably coupled with one another and with the shaft of an electric generator 15. The nuclear reactor 10 is arranged at the gas circulation system 30 between the two gas turbines 13 and 14. The gas flows from the outlet 14a of the second gas turbine 14 via the primary path, generally indicated by reference character 16a, of a recuperative heat exchanger or recuperator 16 and through the agency of a pre-cooler 17 back to the low pressure compressor 11. The secondary path 16b of the recuperative heat exchanger 16 is located between the outlet 12a of the high pressure compressor 12 and the inlet 13a of the first gas turbine 13. Between the low pressure compressor 11 and the high pressure compressor 12 there is arranged an intermediate cooler 18 which, if desired, can be also however omitted.

A return flow conduit or line 19 leads from the outlet 12a of the high pressure compressor 12 to the inlet 17a of the pre-cooler 17. This return flow conduit 19 contains a regulating valve 20 which is closed during normal operation, this valve being automatically actuated by any suitable conventional element 21 responsive to the rotational speed of the turbo-machines 11–14 and the generator 15.

The two gas turbines 13 and 14 are advantageously constructed in such a way that the gas after expansion in the first turbine 13 and therefore during entry into the nuclear reactor 10 possesses an operating pressure which corresponds to the equalization pressure in the gas circulation system 30 in the hot rest state, that is to say, to that pressure at which the entire gas quantity which is present in the circulation system during operation will adjust to upon sudden shutdown of the still hot turbo-machines 11–14. Similarly, the two compressors 11 and 12 are also advantageously designed in such a way that the gas after compression in the low pressure compressor 11 and therefore upon entry into the intermediate cooler 18 possesses a pressure which corresponds to the above-defined equalization pressure in the gas circulation system in the hot rest state.

Figure 2:
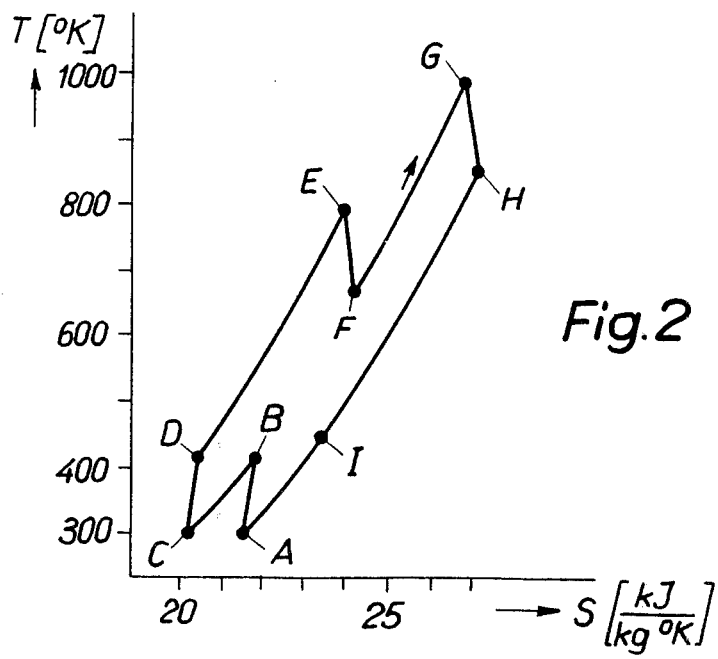
FIG. 2 is a temperature-entropy graph of the installation of FIG. 1 at full load.

The mode of operation of the described energy generating installation can best be understood on the basis of the temperature entropy graph of FIG. 2. The point A of the graph represents the entry of the gas via the inlet 11a into the low pressure compressor 11. During an increase of the gas pressure in the compressor 11 the temperature of the gas increases up to the point B which corresponds to the outlet of the gas from the outlet 11b of the compressor 11. Upon flowing through the intermediate cooler 18 the temperature and the entropy of the gas is reduced to the point C. At the high pressure compressor 12 the pressure of the gas is further increased, with the result that also the temperature increases up to the point D of the graph. Upon passing through the secondary path 16b of the recuperative heat exchanger or recuperator 16, the temperature and the entropy of the gas experience an increase up to the point E of the graph of FIG. 2. Thereafter the gas is expanded at the first gas turbine 13, the temperature reducing down to the point F of the graph. In the nuclear reactor 10 there is thereafter increased the temperature and entropy of the gas up to the point G, whereupon the gas is again expanded in the second turbine 14, the temperature experiencing a reduction down to the point H of the graph of FIG. 2. During subsequent passage of the gas through the primary path 16a of the recuperative heat exchanger 16 and through the precooler 17, the temperature and the entropy of the gas reduce down to the point I and then further down to the point A of the graph of FIG. 2. Thereafter the cycle begins anew.

By means of the mechanical energy developed by the two gas turbines 13 and 14 there are driven the compressors 11 and 12 and the generator 15. The latter generates electrical energy which can be delivered to a network having any suitable and therefore not particularly illustrated electrical energy consumers or loads.

In a large nuclear power plant for an electrical power capacity of, for instance, 500 to 1500 megawatts (MW), and with a fast breeder reactor and a helium circulation system, there prevails during full load operation at the different points A to I of the graph of FIG. 2, the pressures and temperatures which have been listed in the double column (I) of the Table given hereinafter. For the purpose of facilitating understanding of the invention, the reference characters A to I which have been used for designating the points of the graph have additionally also been plotted along the corresponding locations of the gas circulation system of FIG. 1.

TABLE

| | (I) Full Load | | (II) No Load | |
|---|---|---|---|---|
| | p (kg/cm²) | T (°K) | p (kg/cm²) | T (°K) |
| A | 29 | 300 | 35 | 300 |
| B | 52.5 | 386 | 60 | 373 |
| C | 52 | 300 | 59.4 | 300 |
| D | 91 | 385 | 85 | 364 |
| E | 90 | 785 | 84 | 851 |
| F | 60 | 680 | 60 | 757 |
| G | 54 | 1000 | 54 | 1000 |

TABLE-continued

| | (I) Full Load | | (II) No Load | |
|---|---|---|---|---|
| | p (kg/cm²) | T (°K) | p (kg/cm²) | T (°K) |
| H | 30 | 815 | 36 | 881 |
| I | 29.5 | 415 | 35.5 | 394 |

If for some reason all or the majority of the electrical energy consumers supplied by the generator 15 are disconnected from the generator and consequently the generator practically does not take up any more mechanical load, then the rotational speed of the turbo-machines 11–14 begins to rapidly increase, whereby the element 21 which is responsive to the increase in such rotational speed automatically opens the regulating valve 20 at the return flow line or conduit 19 through the agency of the control means 22 to such an extent that the rotational speed of the machines does not exceed a preselected value. The aforementioned rotational speed value is previously fixed by appropriate adjustment of the element 21 responsive to the rotational speed or the control means 22, and specifically in such a way that with the rotational speed which is adjusted at the machines there is realized a sufficient cooling action in the reactor 10. At the same time the output of the reactor 10 is reduced. The aforementioned opening of the regulating valve 20 at the return flow conduit 19 brings about a reduction in pressure at the inlet 13a of the first gas turbine 13, the outlet of which has been designated by reference character 13b. This pressure reduction however does not have any effect at the nuclear reactor 10 since owing to the now reduced mechanical power output of the gas turbines 13 and 14 the pressure gradient in the first turbine 13, as also in the second turbine 14, is smaller than during normal power operation. There are thus set at the gas circulation system 30 new pressure distributions and temperatures which have been listed, for instance, in the double column (II) of the above-given Table. It will be recognized that at the graph points F and G, that is to say, at the inlet 10a and outlet 10b respectively of the reactor 10, which outlet leads to the inlet 14b of the turbine 14, the gas pressure during no-load of the power plant is equal to that during full load. Consequently, the gas pressure in the reactor experiences practically no change during a sudden reduction in the power output of the generator 15, and thus there is precluded the danger of damaging the internal insulation of the reactor and the structure of the reactor core by rapid pressure fluctuations.

The take-up characteristics of the turbines 13 and 14, which during stationary operation, whether such be during full load and closed valve 20 or during no-load and partially open valve 20, must possess mass flows of equal magnitude, dictate the distribution of the ratio of the inlet pressure to the outlet pressure at the turbine 13 and the turbine 14, so that for a constant pressure at the inlet 10a and outlet 10b of the nuclear reactor 10 (graph points F and G) both of the extreme pressures at the inlet 13a of the first turbine 13 and at the outlet 14a of the second turbine 14 (graph points E and H) are fixed. Since additionally, both for full load as well as also for no-load, the quantity of gas in the circulation system remains constant, the proportion by volume of the high pressure side, that is to say, the volume content of the secondary side of the recuperator 16 and the proportion by volume of the low pressure side, that is to say, the sum of the volume content of the primary side of the recuperator 16 and the pre-cooler 17, are to be accommodated to one another such that the gas dislocation brought about by the valve 20 causes the pressure drop required by the turbine characteristics at the high pressure side and the pressure increase required at the low pressure side respectively. According to the example of the above Table, the high pressure side pressure reduction of 6 kg/cm² at the points D and E must correspond to a low pressure side pressure increase of likewise 6 kg/cm² at points H and I.

Since the average temperature at the high pressure side (points D and E) and the average temperature at the low pressure side (points H, I and A) both during full load as well as also during no-load must be similar to one another, there is realized as a favorable solution also similar gas volumes at the high pressure region and the low pressure region of the gas circulation system. In this way there is realized that the equalization pressure of the gas circulation system, which adjusts itself during sudden standstill of the turbo-machines 11–14 in a still operating hot condition, is in the order of about 60 kg/cm² and for the normal operating pressures of the gas at the inlet to the reactor 10 (point F) as well as also at the outlet of the low pressure compressor 11 (point B) at least approximately coincide. This produces the advantage that also during a sudden shutdown of the turbo-machines 11–14, for instance during damage to the buckets, there practically does not occur any rapid pressure fluctuations within the nuclear reactor 10 and moreover at the gas circulation system the pressure changes or fluctuations remain within tolerable limits.

If in the event of an emergency there is necessary a rapid shutting down of the reactor 10, then with a gas-cooled fast breeder reactor there is required that the coolant gas stream flowing through the reactor be reduced without delay in order to avoid an impermissible rapid temperature decrease. The required reduction of the coolant gas stream can be realized with the described installation by an appropriate reduction in the rotational speed of the turbo-machines 11–14, without there thus arising a dangerous rapid reduction in pressure within the reactor. This situation is similar to the previously described situation involving sudden shutdown of the turbo-machines upon damage to the buckets or blades.

Apart from the advantage that rapid pressure fluctuations in the reactor 10 during a sudden load decrease of the generator 15, during rapid shutting-off of the reactor and during sudden standstill of the turbo-machines 11–14, can be avoided, the described power generating installation or plant affords the further advantage that upon the occurrence of a leak in the gas circulation system at a location in front of the inlet to the first turbine 13 and behind the outlet of the second turbine 14 the gas compartment or space of the reactor 10 can only empty via both of the turbines 13 and 14, which provides an effective throttling opposing the escape gas and therefore also in this case prevents an impermissible rapid pressure reduction at the reactor 10. Consequently, it is possible to dispense with the installation of additional throttle locations, for instance in the form of Venturi nozzles which are provided at the state-of-the-art plants for the aforementioned special situation, resulting in a saving in costs and a reduction in the flow resistance at the gas circulation system during normal operation. A leakage of the aforementioned type could, for instance, occur at the pressure vessel consisting of pre-stressed concrete, which in conventional manner encloses the gas-cooled nuclear reactor 10, the compressors 11 and 12, the turbines 13 and 14, the recuperative heat exchanger 16, the coolers 17 and 18, the return flow conduit 19 with the regulating valve 20 and possibly also the generator 15 and a part of the gas circulation system.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A power generating plant comprising a gas-cooled nuclear reactor, means defining a closed gas circulation system containing a gaseous medium used for cooling the reactor and serving as a working medium, compressor means, a first gas turbine and a second gas turbine, said reactor, said compressor means and each of said turbines having a respective inlet and an outlet for the gaseous medium, the closed gas circulation system leading through the compressor means, the nuclear reactor, the first and second gas turbines and back to the compressor means, an electrical generator for delivering electrical energy, at least one of the gas turbines being in driving connection with the compressor means and at least the other of the gas turbines being in driving connection with the electrical generator for the delivery of said electrical energy, said reactor being arranged in the gas circulation system between the outlet of the first turbine and the inlet of the second turbine, a recuperative heat exchanger having a primary path and a secondary path, said primary path being located between the outlet of the second gas turbine and the inlet of the compressor means, the secondary path of the recuperative heat exchanger being arranged between the outlet of the compressor means and the inlet of the first gas turbine, the first and second turbines being constructed with respect to one another in such a manner that in operation of the power generating plant the gaseous medium at the outlet of the first gas turbine and thus at the inlet of the reactor has an operating pressure which is substantially equal to an equalization pressure which the gaseous medium in the gas circulation system assumes in a stationary rest state at substantially operation temperatures.

2. The power generating plant as defined in claim 1, wherein the compressor means comprises a low pressure compressor and a high pressure compressor, each of said low and high pressure compressors having a respective inlet and outlet for the gaseous medium, an intermediate cooler arranged between the outlet of the low pressure compressor and the inlet of the high pressure compressor, said low and high pressure compressors being constructed with respect to one another in such a manner that in operation of the power generating plant the gaseous medium at the outlet of the low pressure compressor has an operating pressure which is substantially equal to said equalization pressure.

* * * * *